United States Patent [19]

Wallender

[11] Patent Number: 4,934,457
[45] Date of Patent: Jun. 19, 1990

[54] COMPOSITION AND METHOD FOR STIMULATING WELLS

[76] Inventor: Kenneth D. Wallender, 3001 Bainbridge, Odessa, Tex. 79762

[21] Appl. No.: 381,454

[22] Filed: Jul. 18, 1989

[51] Int. Cl.$^5$ ............................................. E21B 37/00
[52] U.S. Cl. .................................. 166/304; 166/300; 166/311; 166/273; 166/279; 252/8.3; 252/8.552; 252/186.28; 252/186.41
[58] Field of Search ............... 166/300, 304, 311, 376, 166/273, 252, 166, 279, 302; 252/8.3, 8.551, 8.552, 8.553, 186.28, 186.41

[56] References Cited

U.S. PATENT DOCUMENTS

| 3,241,614 | 3/1966 | Bertness | 166/304 |
| 3,279,541 | 10/1966 | Knox et al. | 166/300 |
| 4,101,425 | 7/1978 | Young et al. | 252/8.55 C |
| 4,464,268 | 8/1984 | Schievelbein | 252/8.55 B |

FOREIGN PATENT DOCUMENTS 523807  8/1982  Australia ............................ 166/304

Primary Examiner—Jerome W. Massie
Assistant Examiner—R. J. Schoeppel
Attorney, Agent, or Firm—Ross, Howison, Clapp & Korn

[57] ABSTRACT

A composition and method for stimulating the production of hydrocarbons from wells partially plugged by paraffins or mineral scale, the composition comprising hydrochloric acid, naphtha and an aqueous solution of hydrogen peroxide. According to the method of the invention, the reactants are serially introduced into the well bore and permitted to react to substantial completion, followed by flushing the wellbore with hot water.

18 Claims, No Drawings

COMPOSITION AND METHOD FOR STIMULATING WELLS

TECHNICAL FIELD

This invention relates to methods for increasing production from oil wells, and more particularly, to a composition and method for stimulating production in wells where production has been limited by paraffin deposition or by the presence of acid soluble scale.

BACKGROUND OF THE INVENTION

Numerous compositions and methods have previously been utilized to stimulate production in wells partially plugged by paraffins or mineral scale. Paraffins have sometimes been removed by circulating hot oil or steam through the casing and production tubing. With such treatments, however, much of the thermal energy imparted to the oil at the surface is dissipated through conductive heat losses to that portion of the formation above the producing zone as the oil is circulated through the well.

Acidizing treatments have also been utilized in an effort to alleviate paraffin and mineral plugging problems that seriously retard production from wells which previously produced at a significantly greater rate. With conventional acidizing treatments, however, problems have been encountered because insufficient heat is generated during the associated reactions to adequately melt and maintain the paraffins in a flowable state until they can be removed from the wellbore.

A new well treatment composition and method are therefore needed that can effectively dissolve minerals plugging pore channels in the formation, and that can also generate sufficient thermal energy downhole to melt and maintain paraffins in a flowable state long enough for them to be circulated out of the wellbore.

SUMMARY OF THE INVENTION

According to the present invention, a composition and method are disclosed that are useful for removing paraffins and mineral scale from a wellbore.

According to one embodiment of the invention, a reactive composition is provided by introducing into a wellbore hydrochloric acid, naphtha, hydrogen peroxide and water.

According to one preferred embodiment of the invention, the subject composition comprises concentrated hydrochloric acid, naphtha and an aqueous solution comprising from about 15 to about 20 percent by weight of hydrogen peroxide.

According to another embodiment of the invention, the subject composition comprises technical grade concentrated hydrochloric acid, naphtha, and an aqueous solution comprising from about 16 to about 18 percent by weight of hydrogen peroxide in a volume ratio of about 1–3 : 2 : 2–3.

According to one particularly preferred embodiment of the invention, the subject composition comprises technical grade concentrated hydrochloric acid, naphtha, and an aqueous solution comprising from about 15 to about 20, and most preferably, from about 16 to about 18 percent by weight of hydrogen peroxide in a volume ratio of about 1 : 2 : 3.

According to another particularly preferred embodiment of the invention, the subject composition comprises technical grade concentrated hydrochloric acid, naphtha, and an aqueous solution comprising from about 15 to about 20, and most preferably, from about 16 to about 18 percent by weight hydrogen peroxide in a volume ratio of about 3 : 2 : 3.

According to another particularly preferred embodiment of the invention, the naphtha component of the subject composition further comprises about one percent of an alkyl phenol ethoxylate.

According to another embodiment of the invention, a method for stimulating production in wells plugged by paraffinic hydrocarbons and acid-soluble mineral scale is provided that comprises the steps of serially introducing into the well concentrated hydrochloric acid, naphtha, and hydrogen peroxide; waiting sufficient time to permit the hydrochloric acid, naphtha and hydrogen peroxide to react to substantial completion; flushing the well with hot water or oil; and thereafter putting the well back on production.

According to a preferred embodiment of the invention, a method for stimulating production in wells plugged by paraffinic hydrocarbons and acid-soluble mineral scale is provided that comprises the steps of sequentially introducing into the well from about one to about three drums of an aqueous solution comprising about 37 percent by weight hydrochloric acid, about two drums of naphtha, and from about two to about three drums of an aqueous solution comprising from about 15 to about 20 percent hydrogen peroxide; waiting sufficient time to permit the hydrochloric acid, naphtha and hydrogen peroxide to react to substantial completion; flushing the well with hot water or oil; and thereafter putting the well back on production.

DESCRIPTION OF THE PREFERRED EMBODIMENTS

The composition of the invention is preferably prepared downhole by introducing into a wellbore sufficient quantities of hydrochloric acid, naphtha and hydrogen peroxide to produce an exothermic reaction with sufficient resultant heat, pressure and reactivity to remove paraffinic hydrocarbons and mineral scale from the producing zone of the formation without causing an explosion that is destructive to the casing or tubing within the well.

According to a preferred embodiment of the invention, the subject composition is prepared by sequentially combining downhole from about 55 to about 165 gallons of concentrated (technical) hydrochloric acid, about 110 gallons of naphtha, and from about 110 to about 165 gallons of an aqueous solution comprising from about 15 to about 20 weight percent hydrogen peroxide.

According to a particularly preferred embodiment of the invention, the subject composition is prepared by sequentially combining downhole from about 55 to about 165 gallons of 37 percent hydrochloric acid; about 110 gallons of naphtha; and from about 110 to about 165 gallons of an aqueous solution comprising from about 16 to about 18 weight percent of hydrogen peroxide.

Although other acids, such as formic acid or glacial acetic acid, can be substituted for the concentrated hydrochloric acid disclosed herein, the use of hydrochloric acid having a concentration of about 37 percent by weight is preferred. Hydrochloric acid in this concentration is labeled as technical grade, has a gravity of about 23 degrees Baume, and is readily available commercially.

Similarly, while other hydrocarbon mixtures may be utilized in place of the naphtha component of the invention under some circumstances, heavier hydrocarbons are less preferred due to their lower rate of reactivity and lighter hydrocarbons are less preferred due to their higher vapor pressure and tendency to flash off.

According to another embodiment of the invention that has proved to be particularly useful in removing paraffin from well bores, the naphtha component is preferably mixed with a minor amount such as, for example, about one percent of an alkyl phenol ethoxylate prior to combining the naphtha with the other reactants of the subject composition. While the function of the alkyl phenol ethoxylate is not fully understood, it has been observed that in its absence paraffin is more likely to be redeposited within the well bore prior to removal. Satisfactory alkyl phenol ethoxylates for use in practicing the present invention are commercially available from Texaco Chemical Company under the tradename 75224 Surfonic N-95, and from Chemlink under the tradename Chemlink 1695.

The hydrogen peroxide utilized in the invention can be obtained commercially in aqueous solutions of various strengths, and then diluted to the extent desired either before or at the time the hydrogen peroxide is introduced into the wellbore. According to a preferred embodiment of the invention, the hydrogen peroxide solution comprises from about 15 to about 20 weight percent hydrogen peroxide at the time it is combined with the hydrochloric acid and naphtha components. When hydrogen peroxide solutions comprising more than about 20 percent hydrogen peroxide are employed, the likelihood of a destructive explosion downhole is increased. Conversely, whenever hydrogen peroxide solutions comprising less than about 15 percent hydrogen peroxide are utilized, the temperatures and pressures resulting from the ensuing reaction may be insufficient to achieve satisfactory results. The use of an aqueous solution comprising from about 16 to about 18 weight percent hydrogen peroxide is particularly preferred in the present invention.

It will be understood by those of ordinary skill in the art that similarly effective results may be achieved in some cases by using greater quantities of weaker solutions of hydrochloric acid or hydrogen peroxide than those herein disclosed as being preferred. According to one such embodiment of the invention, an aqueous solution comprising about three percent of hydrogen peroxide can be continuously trickled down the wellbore during the reaction stage to assist in driving the downhole reaction to completion.

Also, when the subject composition is intended for use in deeper wells where the downhole temperature is greater than would be encountered with a shallower producing formation, preferable results may be obtained by using a greater amount of a slightly weaker hydrogen peroxide solution. Thus, for example, under such circumstances from about 330 to about 550 gallons of a 12 percent aqueous solution of hydrogen peroxide might be satisfactorily substituted as the hydrogen peroxide component in the above formulations.

In any event, it will be appreciated that the volume and strength of the reactants disclosed herein are also affected by the amount of water and hydrocarbons that may already be present downhole at the time the subject reactants are introduced into the wellbore, and it is therefore understood that the numerical values disclosed herein are preferred values based upon satisfactory results achieved through actual experience.

The use of standard safety precautions well known to those of ordinary skill in the art when handling reactive components such as hydrochloric acid and hydrogen peroxide should of course be followed when handling and introducing the subject reactants into the wellbore. Thus, for example, only sterile tanks should be used for storing the hydrogen peroxide solution to avoid triggering a premature reaction. Also, the pumps and lines used to introduce the hydrogen peroxide solution into the wellbore should desirably be flushed with water prior to and following pumping of the hydrogen peroxide solution.

The use of the subject compositions in the method of the invention are further described in the following examples:

EXAMPLE 1

Before introducing the components of the composition of the invention into the wellbore, the well is pumped up to about 500 psi with the tubing valve shut. This procedure aids in keeping the tubing from collapsing due to the pressures generated during the exothermic reaction which proceeds upon introduction of all the reactants. One 55 gallon drum of a 37% solution of hydrochloric acid is then pumped down the annulus between the casing and the production tubing, followed by two 55 gallon drums of naphtha containing about one percent of an alkyl phenol ethoxylate. The pump is then flushed with about one drum of water, after which three 55 gallon drums of an aqueous solution of hydrogen peroxide (previously prepared by diluting one drum of a 50 percent solution with two drums of water) are pumped downhole. The pump and flow lines are then flushed again with about one barrel of water. Once all reactants have been introduced into the wellbore so as to be combined in that section of the wellbore adjacent the producing zone, an exothermic reaction commences, greatly increasing the downhole temperature and pressure. The reaction is permitted to go to substantial completion, requiring a wait time of from about 30 to about 45 minutes, depending upon the depth of the well and the size of the casing. After the reaction has subsided, as noted by monitoring downhole pressure, the tubing valve is reopened and the well is flushed by circulating about 75 barrels of hot water through the well to remove the melted paraffin and other reaction byproducts. About 25 gallons of a commercially available paraffin dispersant is optionally added to the hot water to assist in maintaining the paraffin in a slurry while being hot watered from the well. The well is then returned to production. Through use of the composition and method of the invention, production is increased from about 20 barrels of oil per day to over 100 barrels of oil per day.

EXAMPLE 2

In another well, the procedures of Example 1 are repeated using three 55 gallon drums of hydrochloric acid solution, two 55 gallon drums of naphtha containing about one percent of an alkyl phenol ethoxylate, and three 55 gallon drums of hydrogen peroxide solution prepared as before. Following completion of the process, production is increased from about nine barrels of oil per day to about 26 barrels of oil per day.

While hot oiling can be substituted for hot watering to remove the spent reactants and melted paraffins from the wellbore, the use of hot watering is preferred.

It will be understood and appreciated by those of ordinary skill in the art upon reading this disclosure that satisfactory results in stimulating wells may also be achieved by using various other strengths and quantities of the reactants disclosed herein in such proportions that their resultant reactivity and effectiveness in reducing paraffin and mineral scale buildup downhole are substantially the same as achieved through use of those disclosed. In such instances it is intended that the scope of the appended claims be limited only by the broadest interpretation to which the inventor is legally entitled.

I claim:

1. A composition for stimulating production of hydrocarbons from a wellbore, said composition consisting essentially of hydrochloric acid, naphtha, hydrogen peroxide and water.

2. A composition for stimulating production of hydrocarbons from a wellbore, said composition comprising concentrated hydrochloric acid, naphtha and an aqueous solution further comprising from about 15 to about 20 percent by weight of hydrogen peroxide, wherein said hydrochloric acid, naphtha, and aqueous solution of hydrogen peroxide are present in a volume ratio of about 1-3 : 2 : 2-3.

3. The composition of claim 2 comprising technical grade concentrated hydrochloric acid, naphtha, and an aqueous solution comprising from about 16 to about 18 percent by weight of hydrogen peroxide.

4. The composition of claim 2 wherein said hydrochloric acid, naphtha, and aqueous solution of hydrogen peroxide are present in a volume ratio of about 1 : 2 : 3.

5. The composition of claim 2 wherein said hydrochloric acid, naphtha, and aqueous solution of hydrogen peroxide are present in a volume ratio of about 3 : 2 : 3.

6. The composition of claim 2 wherein said naphtha further comprises a effective amount of an alkyl phenol ethoxylate.

7. The composition of claim 6 wherein said effective amount of alkyl phenol ethoxylate is about one percent.

8. A method for stimulating production in wells plugged by paraffinic hydrocarbons and acid-soluble mineral scale is provided that comprises the steps of serially introducing into the well concentrated hydrochloric acid, naphtha, and an aqueous solution of hydrogen peroxide; waiting sufficient time to permit the hydrochloric acid, naphtha and hydrogen peroxide to react to substantial completion; and flushing the well with hot water.

9. The composition of claim 1 consisting essentially of hydrochloric acid, naphtha and an aqueous solution comprising from about 15 to about 20 percent by weight of hydrogen peroxide.

10. The composition of claim 9 consisting essentially of concentrated hydrochloric acid, naphtha, and an aqueous solution comprising from about 16 to about 18 percent by weight of hydrogen peroxide.

11. The composition of claim 9 wherein said hydrochloric acid, naphtha, and aqueous solution of hydrogen peroxide are present in a volume ration of about 1-3 : 2 : 2- 3.

12. The composition of claim 11 wherein said hydrochloric acid, naphtha, and aqueous solution of hydrogen peroxide are present in a volume ratio of about 1 : 2 : 3.

13. The composition of claim 11 wherein said hydrochloric acid, naphtha, and aqueous solution of hydrogen peroxide are present in a volume ratio of about 3 : 2 : 3.

14. The composition of claim 1 wherein said naphtha further comprises an effective amount of an alkyl phenol ethoxylate.

15. The composition of claim 14 wherein said effective amount of alkyl phenol ethoxylate is about one percent.

16. The method of claim 8 wherein said concentrated hydrochloric acid is an aqueous solution comprising about 37 percent by weight hydrochloric acid.

17. The method of claim 8 wherein said aqueous solution of hydrogen peroxide comprises from about 15 to about 20 percent hydrogen peroxide.

18. The method of claim 8 wherein said concentrated hydrochloric acid, naphtha, and aqueous solution of hydrogen peroxide are introduced into the well in a volume ratio of about 1-3 : 2 : 2-3.

* * * * *